(12) United States Patent
Ishimaru et al.

(10) Patent No.: US 6,938,719 B2
(45) Date of Patent: Sep. 6, 2005

(54) SPEED CONTROL SYSTEM FOR WHEELED HYDRAULIC TRAVELING VEHICLE

(75) Inventors: Hideharu Ishimaru, Niihari-gun (JP); Toshihiko Shinya, Noda (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 153 days.

(21) Appl. No.: 10/363,239

(22) PCT Filed: Sep. 10, 2001

(86) PCT No.: PCT/JP01/07837
§ 371 (c)(1),
(2), (4) Date: Mar. 6, 2003

(87) PCT Pub. No.: WO02/21023
PCT Pub. Date: Mar. 14, 2002

(65) Prior Publication Data
US 2004/0020703 A1 Feb. 5, 2004

(30) Foreign Application Priority Data
Sep. 8, 2000 (JP) ...................... 2000-273736

(51) Int. Cl.⁷ .............................................. F16D 31/02
(52) U.S. Cl. ...................... 180/305; 180/307; 701/50; 60/443; 60/431
(58) Field of Search ................................. 180/305, 307, 180/308; 60/443, 431; 701/50

(56) References Cited

U.S. PATENT DOCUMENTS

| 4,947,952 A | * | 8/1990 | Kajiwara | 180/178 |
|---|---|---|---|---|
| 5,056,615 A | * | 10/1991 | Duthie et al. | 180/306 |
| 5,784,883 A | * | 7/1998 | Ohkura et al. | 60/327 |
| 6,182,448 B1 | * | 2/2001 | Ohkura et al. | 60/445 |
| 6,220,028 B1 | * | 4/2001 | Ishikawa et al. | 60/431 |
| 6,260,647 B1 | * | 7/2001 | Calamari et al. | 180/179 |
| 6,336,518 B1 | * | 1/2002 | Matsuyama | 180/306 |
| 6,360,537 B1 | * | 3/2002 | Widemann | 60/451 |
| 6,558,072 B2 | * | 5/2003 | Staffenhagen et al. | 404/117 |
| 6,644,429 B2 | * | 11/2003 | Evans et al. | 180/307 |
| 6,655,233 B2 | * | 12/2003 | Evans et al. | 74/731.1 |
| 6,688,418 B2 | * | 2/2004 | Bohrer | 180/305 |

FOREIGN PATENT DOCUMENTS

| JP | 47-29806 | 8/1972 |
|---|---|---|
| JP | A 48-45753 | 6/1973 |
| JP | 55-149647 | 10/1980 |
| JP | A 2-34440 | 2/1990 |
| JP | U 6-50955 | 7/1994 |

* cited by examiner

Primary Examiner—Christopher P. Ellis
Assistant Examiner—Jeff Restifo
(74) Attorney, Agent, or Firm—Oliff & Berridge, PLC (57) ABSTRACT

Control valves are respectively provided in a pair of variable displacement hydraulic pumps. If an ultra low speed travel signal is issued in response to an ultra-low-speed switch turned on, one of the control valves is fixed to a neutral position by a solenoid valve. And a displacement amount of a travel motor is fixed at a maximum displacement by another solenoid valve. In this way, an upper limit for motor rotation speed is significantly reduced. As a result, it is possible to realize the ultra low speed travel with maximum operation of an accelerator pedal, without the need for subtle operation of the accelerator pedal.

16 Claims, 6 Drawing Sheets

SPEED CONTROL SYSTEM FOR WHEELED HYDRAULIC TRAVELING VEHICLE

The present application is based on Japanese patent application No. 2000-273736 (filed Sep. 8, 2000), the contents thereof are incorporated herein by reference.

TECHINICAL FIELD

The present invention relates to a speed control system for a wheeled hydraulic traveling vehicle such as a wheeled hydraulic excavator.

BACKGROUND ART

Generally, a traveling control circuit of a wheeled hydraulic excavator comprises a variable displacement hydraulic pump driven by a prime mover, a variable displacement hydraulic motor driven by pressure oil discharged from the hydraulic pump, and a control valve for controlling flow of pressure oil fluid supplied from the hydraulic pump to the hydraulic motor. A pair of hydraulic pumps and a pair of control valves are provided. Respective control valves are simultaneously switched to merge pressure oil from each hydraulic pump and supply this merged oil to the hydraulic motor.

The motor rotation speed of this type of wheeled hydraulic excavator is adjusted depending on the amount of depression of the accelerator pedal. In addition, it is possible to change a gear ratio between the output shaft of the hydraulic motor and a vehicle wheel using a transmission. For example, the transmission sets a low speed range or a high speed range to obtain a gear ratio in two levels. In this way, it is possible that the vehicle travels at a wide range of speeds from low speed travel for a work site to statutory speed travel (high speed) for public roads.

With the above described wheeled hydraulic excavator, an ultra low travel speed (for example 2 km/h) may be required which is similar to the speed of a hydraulic excavator mounted with a crawler. That is required for a mowing operation, for example, using a mowing unit which is fitted as a working attachment for the wheeled hydraulic excavator. The ultra low travel speed is achieved by switching the transmission to a low-speed range and adjusting the amount of depression of the accelerator pedal, however, it is difficult and imposes a significant burden on an operator.

DISCLOSURE OF THE INVENTION

An object of the present invention is to provide a speed control unit for a wheeled hydraulic traveling vehicle capable of easily realizing an ultra low speed travel.

In order to obtain the above described object, a speed control system for a wheeled hydraulic traveling vehicle in the present invention, comprises a plurality of variable displacement hydraulic pumps respectively driven by a prime mover; a pump displacement regulation device that respectively regulates displacement amount of the hydraulic pumps; a variable displacement hydraulic motor for traveling driven by pressure oil discharged from the plurality of hydraulic pumps; a motor displacement regulation device that regulates a displacement amount of the hydraulic motor; a plurality of control valves, respectively provided in correspondence with the hydraulic pumps, that controls flow of the pressure oil supplied to the hydraulic motor from the hydraulic pumps in response to a travel control command; an ultra low speed command device that issues an ultra low speed travel signal; and a first ultra low speed control device that controls the motor displacement regulation device to set the displacement amount of the hydraulic motor to maximum, and controls drive of the control valves to allow the pressure oil to flow from at least one of the plurality of hydraulic pumps to the hydraulic motor while preventing the pressure oil flowing from the remaining hydraulic pumps to the hydraulic motor, if the ultra low speed travel command is issued by the ultra low speed command device.

When the ultra low speed travel signal is not issued by the ultra low speed command device, the first ultra low speed control device may control the motor displacement regulation device to vary the displacement amount of the motor in response to pressure supplied to the hydraulic motor, and controls drive of the control valves to allow the pressure oil to flow from the plurality of hydraulic pumps to the hydraulic motor.

It is possible to further comprise a rotation speed adjustment device that adjusts a rotation speed of the prime mover; and a second ultra low speed control device that controls the rotation speed adjustment device, when the ultra low speed travel signal is issued by the low speed command device, to set an upper limit of the rotation speed of the prime mover lower than an upper limit set when the ultra low speed travel signal is not issued.

It is preferable to further comprise a third ultra low speed control device that controls the pump displacement regulation device to reduce the displacement amount of the at least one hydraulic pump permitted to flow the pressure oil to the hydraulic motor by a specified amount when the ultra low speed travel signal is issued by the ultra low speed command device.

When the ultra low speed travel signal is not issued by the ultra low speed command device, the third ultra low speed control device may control the pump displacement regulation device to adjust the displacement amount of the plurality of hydraulic pumps according to discharge pressure of the hydraulic pumps.

It is preferable to further comprise a gear ratio change device that changes a gear ratio between an output shaft of the hydraulic motor and vehicle wheels with at least two levels. The gear ratio change device may set a largest gear ratio in response to the ultra low speed travel signal from the ultra low speed command device.

In order to achieve the above described object, a speed control system for a wheeled hydraulic traveling vehicle in the invention, comprises: a variable displacement hydraulic pump driven by a prime mover; a pump displacement regulation device that regulates a displacement amount of the hydraulic pump; a variable displacement hydraulic motor for traveling driven by pressure oil discharged from the hydraulic pump; a motor displacement regulation device that regulates a displacement amount of the hydraulic motor; a control valve that controls flow of the pressure oil supplied to the hydraulic motor from the hydraulic pump in response to a travel control command; an ultra low speed command device that issues an ultra low speed travel signal; and an ultra low speed control device that controls the motor displacement regulation device to set the displacement amount of the hydraulic motor to maximum if the ultra low speed travel signal is issued by the low speed command device.

If the ultra low speed travel signal is issued by the ultra low speed command device, it is preferable that the ultra low speed control device also controls the pump displacement regulation device to set the displacement amount of the hydraulic pump to a specified displacement amount.

Furthermore, a rotation speed adjustment device that adjust a rotation speed of the prime mover may be provided and if the ultra low speed travel signal is issued by the ultra low speed command device, the ultra low speed control device also controls the rotation speed adjustment device to regulate the rotation speed of the prime mover to a specified rotation speed.

As described above, if an ultra low speed travel signal is issued, the displacement amount of the hydraulic motor is set to the maximum and amount of the pressure oil supplied from the hydraulic pump to the hydraulic motor is restricted. Furthermore, an upper limit for rotational speed of the prime mover is set low. In this manner, it is possible to significantly reduce the upper limit for the rotation speed of the hydraulic motor and to easily realize the ultra low speed travel of the vehicle. On the other hand, when the ultra low speed signal is not issued, the motor displacement can be controlled in accordance with pressure supplied to the hydraulic motor. In this manner, it is possible for the vehicle to travel at a wide range of speeds.

BEST MODE FOR CARRYING OUT THE INVENTION

The case of applying a speed control system for a wheeled hydraulic traveling vehicle of the present invention to a wheeled hydraulic excavator will now be described using FIG. 1 to FIG. 7. A wheeled hydraulic excavator comprises an undercarriage, an upper structure connected on the undercarriage so as to be capable of swinging, and an attachment for working attached to the upper structure.

Figure 1:
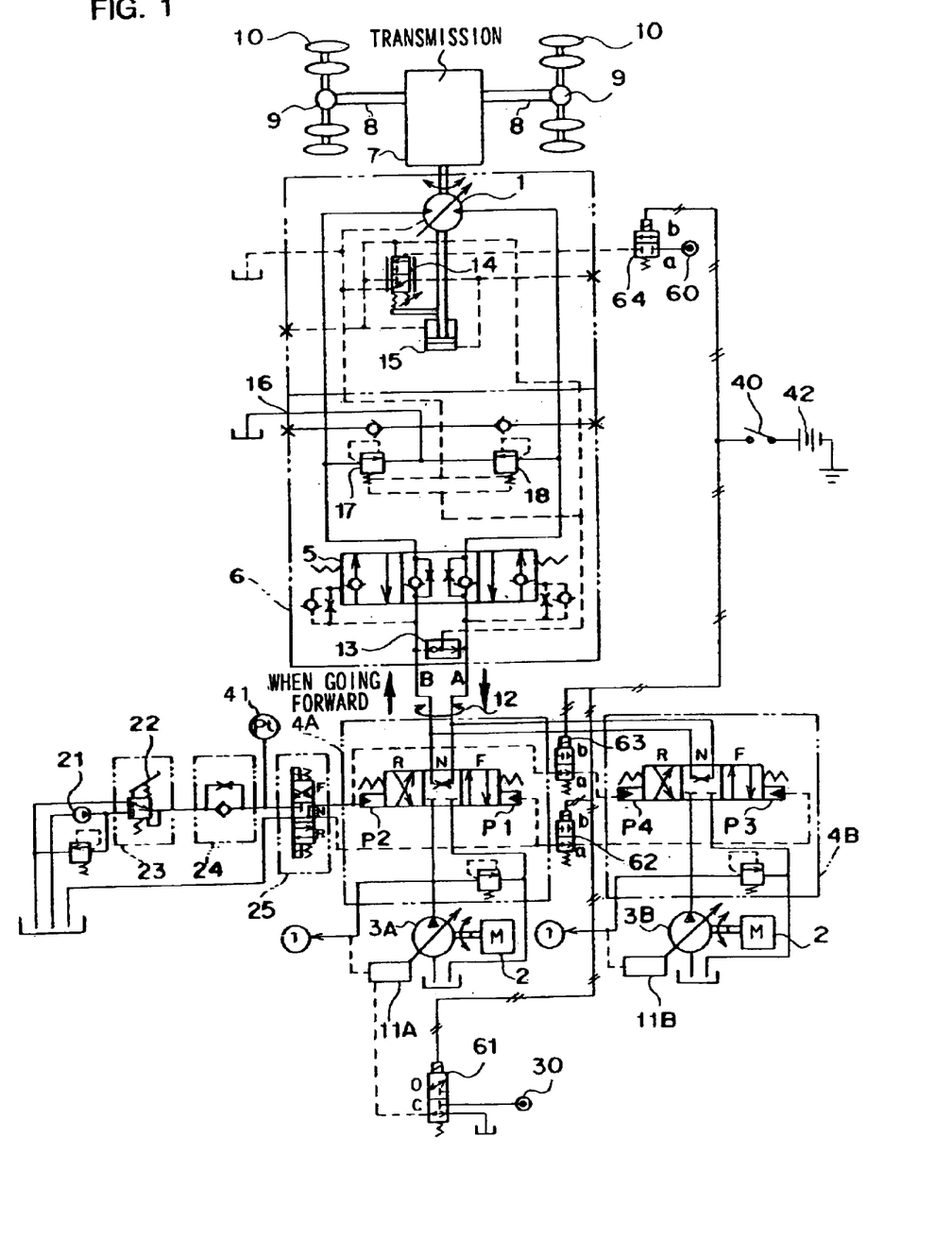
FIG. 1 is a hydraulic circuit diagram for traveling adapted in a wheeled hydraulic excavator of an embodiment of the present invention.

FIG. 1 is a hydraulic circuit diagram for traveling of the wheeled hydraulic excavator. As shown in FIG. 1, the travel hydraulic circuit of the wheeled hydraulic excavator comprises a pair of variable displacement main pumps 3A and 3B respectively driven by an engine (prime mover) 2, a pair of control valves 4A and 4B provided respectively corresponding to the main pumps 3A and 3B, a brake valve 6 with a counter balance valve 5 built therein, and a variable displacement hydraulic motor for traveling 1. The control valves 4A and 4B are driven by a pilot pressure from a pilot control circuit. An ultra-low-speed switch 40 for issuing a ultra-low-speed travel signal for the wheeled hydraulic excavator is also provided. The ultra-low-speed switch 40 will be described later.

Direction and flow amount of discharge oil from the variable displacement hydraulic pump 3A are controlled by the control valve 4A. Similarly, direction and flow amount of discharge oil from the variable displacement hydraulic pump 3B are controlled by the control valve 4B. The pressure oil controlled by the control valves 4A and 4B is supplied through the brake valve 6 to the variable displacement hydraulic motor for traveling 1. The rotation speed of the travel motor 1 is varied by a transmission 7. The varied rotation of the travel motor 1 is transmitted through a propeller shaft 8 and axles 9 to tires 10, to propel the wheeled hydraulic excavator.

A gear ratio of the transmission 7 is set by operation of a lever, not shown. If the lever is shifted to a "low" position, the transmission 7 is set to a low-speed range, and the wheeled hydraulic excavator travels at low speed with high torque. If the lever is shifted to a "high" position, the transmission 7 is set to a high-speed range, and the wheeled hydraulic excavator travels at high-speed with low torque. A gear ratio RL achieved when the transmission 7 is set to the low-speed range is larger than a gear ratio RH achieved when the transmission is set to the high-speed range. Although omitted from the drawings, the discharge oil from the main pumps 3A and 3B (referring to ① in FIG. 1) is also guided to a hydraulic circuit for driving working attachments including a boom, arm and bucket etc., and to a hydraulic circuit for swinging the upper structure.

Figure 2:
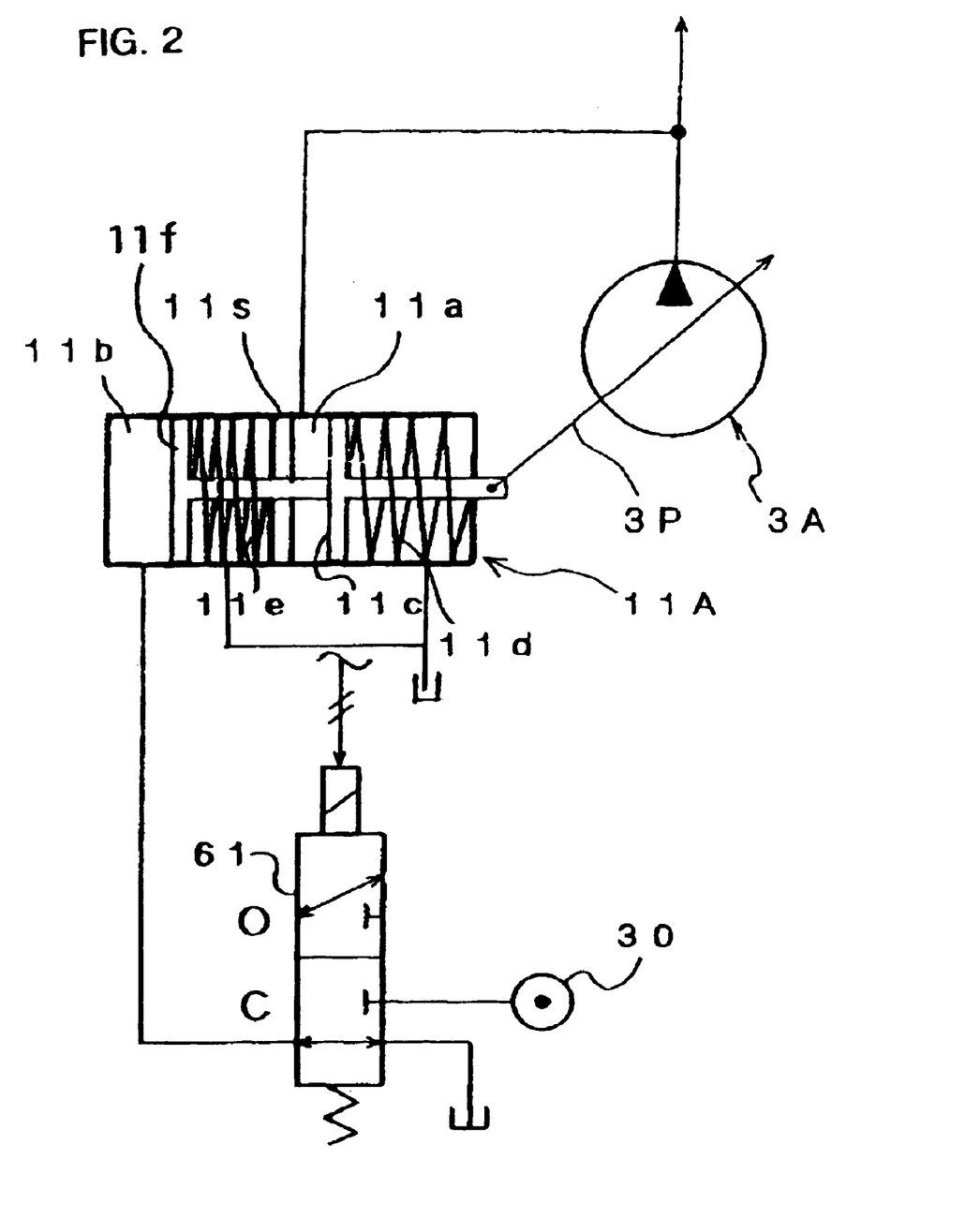
FIG. 2 is a drawing showing detail of a regulator for a variable displacement hydraulic pump of FIG. 1.

Details of a regulator 11A for regulating a displacement amount of the main pump 3A is shown in FIG. 2. A torque restriction section 11a is provided in the regulator 11A. The torque restriction section 11a is comprised of a piston 11c, a spring lid, and a maximum displacement restriction section 11s. The piston 11c is connected to a pump swash plate 3P of the hydraulic pump 3A. The spring 11d urges the piston 11c towards the maximum displacement restriction section 11s.

Figure 3:
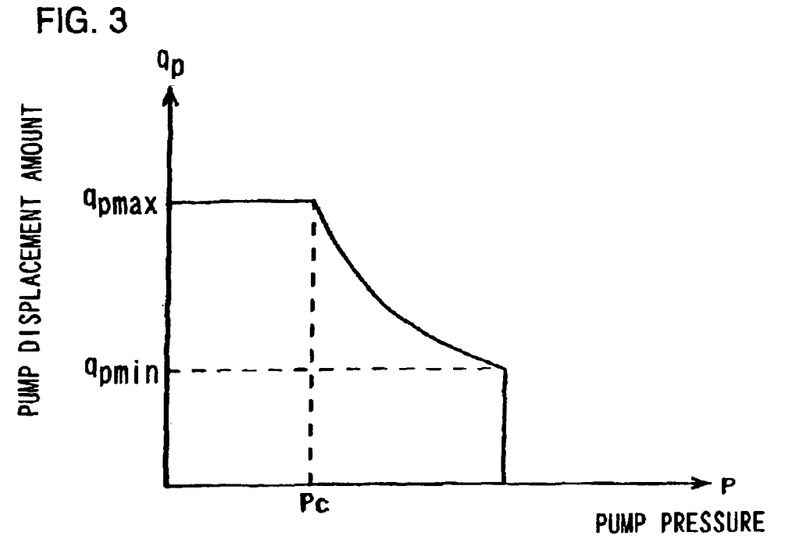
FIG. 3 is a P-qp diagram of the variable displacement hydraulic pump of FIG. 1.

Discharge pressure from the hydraulic pump 3A is fed back to the torque restriction section 11a and horsepower control is carried out. A relationship between a pump pressure P of the variable displacement hydraulic pump 3A and a pump displacement amount qp (a P-qp diagram) is shown in FIG. 3. Horse power control is carried out based on the P-qp diagram as shown in FIG. 3. The pump displacement amount of the variable displacement hydraulic pump 3A is controlled by the regulator 11A so that a load determined by the pump discharge pressure P and the pump displacement amount (displacement angle, displacement amount or simply displacement) qp does not exceed engine output.

The feedback pump pressure P from the hydraulic pump 3A is guided to the regulator 11A, and if the pump pressure P exceeds Pc, the piston 11c is driven to the right in FIG. 2 against the spring force. Specifically, the displacement amount qp decreases in accordance with the P-qp diagram shown in FIG. 3. On the other hand, in a region where the feedback pump pressure P is equal to or less than Pc, the piston 11c is urged to the left in FIG. 2 by the spring force and its movement is restricted by the maximum displacement restriction section 11s. At this time, the pump displacement amount qp becomes the maximum displacement qpmax.

Furthermore, a maximum displacement restriction section 11b is provided in the regulator 11A. The maximum displacement restriction section 11b comprises a spring 11e and a piston 11f. And, the maximum displacement restriction section 11b is also connected to a hydraulic source 30 via a solenoid switching valve 61. The solenoid switching valve 61 is switched in response to operation of the ultra-low-speed switch 40 shown in FIG. 1. If the ultra-low-speed switch 40 is turned on, the solenoid switching valve 61 is switched to the O position, then pressure oil from the hydraulic source 30 acts on the maximum displacement restriction section 11b. Consequently, the piston 11f is moved to the right in FIG. 2 against the spring 11e and moreover against the spring lid, so as to restrict a maximum extent to which the piston 11 is allowed to move to a specified value. In other words, the maximum displacement restriction section lib regulates the maximum displacement of the pump 3A. Specifically, when the ultra-low-speed switch 40 is turned on, the maximum displacement of the pump is limited to the minimum displacement qpmin shown in the P-qp diagram of FIG. 3.

The maximum displacement qpm of the pump set as described above, namely the minimum displacement qpmin, is determined based on a set ultra-low-speed velocity, an engine speed N and a motor displacement qm. The pump maximum displacement qpm is set by decreasing a specified amount from a displacement amount set when the ultra-low-speed switch 40 is turned off. The pump maximum displacement qpm is determined based on a relationship between a pump flow rate Q related to travel speed, namely a product of the pump displacement qp and the engine speed N, and the motor displacement qm set when this pump flow rate Q is supplied to the motor.

When the ultra-low-speed switch 40 is turned off, the maximum displacement restriction section 11b communicates with a reservoir as the C position is set, and the pump displacement qp is controlled according to the above described horse power control. It is to be noted that the ultra-low-speed switch 40 is operated while driving and is provided in an operator's cabin.

Although omitted from the drawings, a torque restriction section 11a is also provided in the regulator 11B of the main pump 3B. The hydraulic pump 3B is subjected to horse power control in the same way as for the hydraulic pump 3A described above. However, the maximum displacement restriction section 11b communicating with the hydraulic source 30 is not provided in the regulator 11B.

As shown in FIG. 1, a pilot circuit comprises a pilot pump 21, a pilot valve 23, a slow-return valve 24 and a forward and reverse switching valve 25. The pilot valve 23 generates or outputs a pilot secondary pressure in accordance with depression of the accelerator pedal 22. The slow-return valve 24 is connected with the pilot valve 23 and delays oil returning to the pilot valve 23. The forward and reverse switching valve 25 is connected with the slow-return valve 24 and selects forward, reverse or neutral for vehicle traveling. The forward and reverse switching valve 25 is switched by operation of a control lever, not shown, provided in the vicinity of a steering wheel etc.

Solenoid valves 62 and 63 are respectively provided between pilot ports P1, P2 of the control valve 4A and pilot ports P3, P4 of the control valve 4B. The solenoid valves 62 and 63 are switched in response to operation of the ultra-low-speed switch 40. In the event that the ultra-low-speed switch 40 is turned off, each of the solenoid valves 62 and 63 is set at the a position, and the pilot ports P1 and P3 and also the pilot ports P2 and P4 are respectively communicated. In this manner, pilot pressure from the pilot control circuit acts on the pilot ports P1 to P4. Accordingly, the control valves 4A and 4B are switched. Switching direction and stroke amount of the control valves 4A and 4B are controlled according to the pilot pressure. Travel speed of the vehicle can be adjusted by controlling stroke amount of the control valves 4A and 4B based on the amount of depression of the accelerator pedal 22.

On the other hand, if the ultra-low-speed switch 40 is turned on, each of the solenoid valves 62 and 63 is switched to the b position, and the pilot ports P1 and P3 and the pilot ports P2 and P4 are respectively disconnected. The pilot pressure from the pilot circuit then acts only on the pilot ports P1 and P2. Therefore, only the control valve 4A is switched according to the pilot pressure, and the control valve 4B is maintained at a neutral position.

Figure 4:
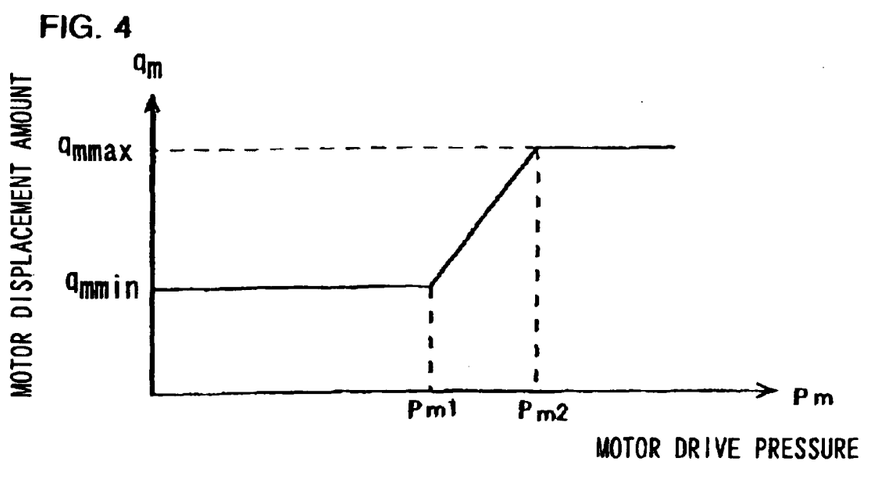
FIG. 4 is a Pm-qm diagram of the variable displacement hydraulic pump of FIG. 1.

A travel motor 1 is provided with a self displacement control mechanism using pressure oil supplied to the motor itself. A characteristic diagram showing the relationship between a motor drive pressure Pm and a motor displacement amount qm is shown in FIG. 4. The motor drive pressure Pm1 corresponds to the minimum motor displacement amount qmmin, and the motor drive pressure Pm2 corresponds to the maximum motor displacement amount qmmax. When the motor drive pressure Pm is within the range of Pm1 to Pm2, the motor displacement amount qm varies between pmmin and qmmax depending on the pressure. The pressure for self displacement control of the travel motor 1 is output from a shuttle valve 13 and acts to a control piston 14 and a servo piston 15 of the travel motor 1.

If the pressure becomes greater than or equal to a specified value Pm1, the control piston 14 is switched to lead the pressure oil to a bottom chamber of the servo piston 15. Accordingly, the motor displacement amount qm increases. If the pressure becomes greater than or equal to a specified value Pm2, the motor displacement amount qm is set to the maximum motor displacement amount qmmax. Then, the travel motor 1 is driven at low speed with high torque. With the pressure less than or equal to the specified value Pm1, the control piston 14 is switched to the position as shown in FIG. 1. Then the motor displacement amount qm is set to the minimum motor displacement amount qmmin and the travel motor 1 is driven at high speed with low torque.

A pilot chamber of the control piston 14 is also connected to a hydraulic source 60 via a solenoid valve 64. The solenoid valve 64 is switched in response to operation of the ultra-low-speed switch 40. If the ultra-low-speed switch 40 is turned on, the pressure oil from the hydraulic source 60 acts to the pilot chamber of the control piston 14. The control piston 14 is then driven so that the pressure oil selected by the shuttle valve 13 is guided to the bottom chamber of the servo piston 15. As a result, regardless of the magnitude of motor drive pressure Pm, the motor displacement amount qm is set to the maximum motor displacement amount qmmax. On the other hand, if the ultra-low-speed switch 40 is turned off, supply of the pressure oil from the hydraulic power source 60 is cut off and the motor displacement amount qm varies in accordance with the motor drive pressure Pm as described previously.

Next, explanation will be given to how the above-described hydraulic circuit for traveling operates. It is to be noted, operation relating to the ultra-low-speed switch 40 will be described later.

FIG. 1 shows a condition where the ultra-low-speed switch 40 is turned off, the forward and reverse switching valve 25 is in neutral (at N position), and the travel pilot valve 23 has not been operated. Accordingly, the control valves 4A and 4B are in their neutral positions. Pressure oil from the main pumps 3A and 3B is returned to the reservoir, and the vehicle is stopped. If the forward and reverse switching valve 25 is switched to the forward (F position) or the reverse (R position) and the accelerator pedal 22 is depressed, a pilot secondary pressure is generated from the pilot valve 23 in accordance with amount of accelerator pedal depression.

The pilot pressure generated in proportion to the amount of depression of the accelerator pedal 22 is output as a forward side pilot pressure oil or a reverse side pilot pressure oil by passing through the forward and reverse switching valve 25. When the forward and reverse switching valve 25 is in the forward position (F position), the pressure oil acts on the pilot ports P1 and P3 of the control valves 4A and 4B as the forward side pilot pressure. When the forward and reverse switching valve 25 is in the reverse position (R position), the pressure oil acts on the pilot ports P2 and P4 of the control valves 4A and 4B as the reverse side pilot pressure. In this manner, the control valves 4A and 4B are switched according to the pilot pressure. A pressure sensor 41 detects a travel pilot pressure oil, and outputs it as a pilot pressure signal Pt, which will be described later.

If the accelerator pedal 22 is released during traveling, the travel pilot valve 23 stops the pressure oil from the pilot pump 21. The output port of the travel pilot valve 23 is then connected to the reservoir. As a result, the pressure oil that has acted on the pilot ports P1–P4 of the control valves 4A and 4B is returned to the reservoir via the forward and reverse switching valve 25, the slow return valve 24 and the travel pilot valve 23. At this time, the control valves 4A and 4B are gradually switched to their neutral positions since return oil is restricted by a restrictor of the slow-return valve 24. Once the control valves 4A and 4B are switched to their neutral positions, discharge oil from the main pumps 3A and 3B is returned to the reservoir. Supply of the drive pressure oil to the travel motor 1 is then turned off and the counter balance valve 5 is switched to the neutral position as illustrated in the figure.

In this case, the vehicle continues traveling under the inertial force of the vehicle. The travel motor 1 changes its operation from motor operation to pump operation, and when traveling forward, the B port side becomes the intake while the A port side becomes the outlet. Since the pressure oil from the travel motor 1 is restricted by the restrictor (a restrictor at the neutral position) of the counter balance valve 5, pressure between the counter balance valve 5 and the travel motor 1 rises and acts on the travel motor 1 as a brake pressure. As a result, the travel motor 1 generates braking torque and the vehicle is caused to brake. If intake oil amount is insufficient during the pump operation, the oil amount is supplemented from the make-up port 16. The maximum pressure of the brake pressure is regulated by the relief valves 17 and 18.

Since oil returning from the relief valves 17 and 18 is led to the intake side of the travel motor 1 while the relief valves 17 and 18 relieve pressure, the motor constitutes a closed circuit therein and there is possibility that a hydraulic oil temperature rises to cause a detrimental effect on the components. For this reason, a small flow amount of pressure oil is released from the restriction at the neutral position of the counter balance valve 5 and led to the control valves 4A and 4B. The control valves 4A and 4B respectively communicate the A and B ports with each other in their neutral position (N position) (referred to as A-B communication), and return the pressure oil again to the intake side of the travel motor 1 to form a circulation circuit. In this manner, the hydraulic oil temperature is lowered.

In the case where the accelerator pedal 22 is released when going downhill, hydraulic brake is caused to operate, similarly to at the time of deceleration described above. In this way, the vehicle travels downhill under inertial while causing the vehicle to brake. When going downhill, even if the accelerator pedal 22 is being pressed down, the counter balance valve 5 is switched to the neutral position. And hydraulic brake pressure is generated so as to obtain motor rotation speed (travel speed) according to flow rate supplied from the main pumps 3A and 3B to the travel motor 1.

Figure 5:
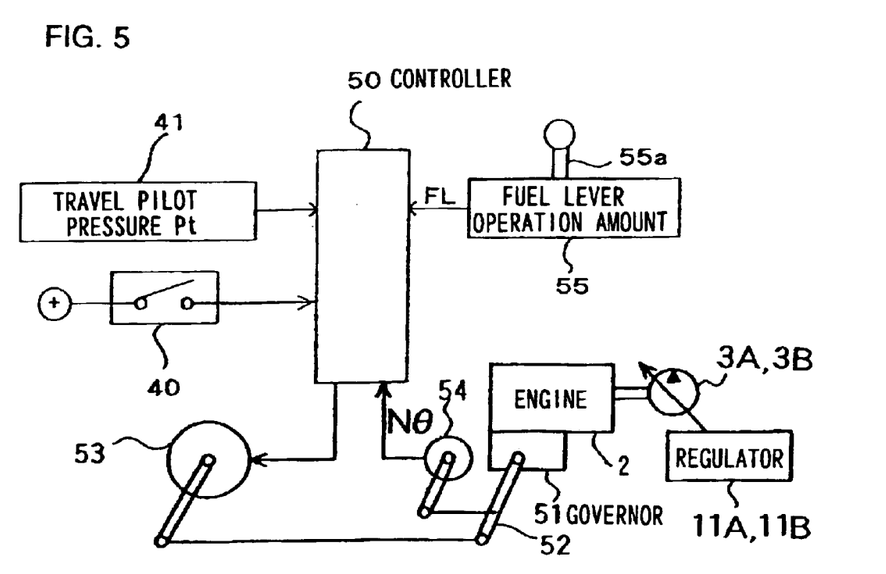
FIG. 5 is a drawing for describing a control circuit for control of engine speed.

Next, a description will be given of rotational speed control of the engine 2 for driving the main pumps 3A and 3B. FIG. 5 is a block diagram of a control circuit for controlling engine rotation speed. Each of the components is controlled by a controller 50 constituted of a CPU or the like.

The ultra-low-speed switch 40, potentiometers 54 and 55 and a pilot pressure sensor 41 are respectively connected to the controller 50. The potentiometer 55 issues a signal of a target rotation speed FL according to manual operation of an engine speed control lever or a fuel lever 55*a* provided in the operator's cabin. The potentiometer 54 will be described later. The pilot pressure sensor 41 detects a travel pilot pressure Pt. Signals from the ultra-low-speed switch 40, the potentiometers 54 and 55 and the pilot pressure sensor 41 are input to the controller 50. The fuel lever 55*a* is operated when setting engine speed for working, and is held in position even once it is let go.

A governor 51 of the engine 2 is connected with a rotation speed adjustment device 53 via a link mechanism 52. The rotation speed adjustment device 53 comprises a pulse motor or the like and controls rotation speed of the engine 2 by using rotation of the pulse motor. Specifically, the rotation speed of the engine 2 is increased with normal rotation of the pulse motor 53 and decreased with reverse rotation of the pulse motor 53. The rotation of the pulse motor 53 is controlled in response to signals from the controller 50. The potentiometer 54 is connected with the governor 51 via the link mechanism 52. The potentiometer 54 detects a governor lever angle in correspondence with the rotation speed of the engine 2. The rotation speed corresponding to the governor lever angle is input to the controller 50 as an engine control rotation speed Nθ.

Figure 6:
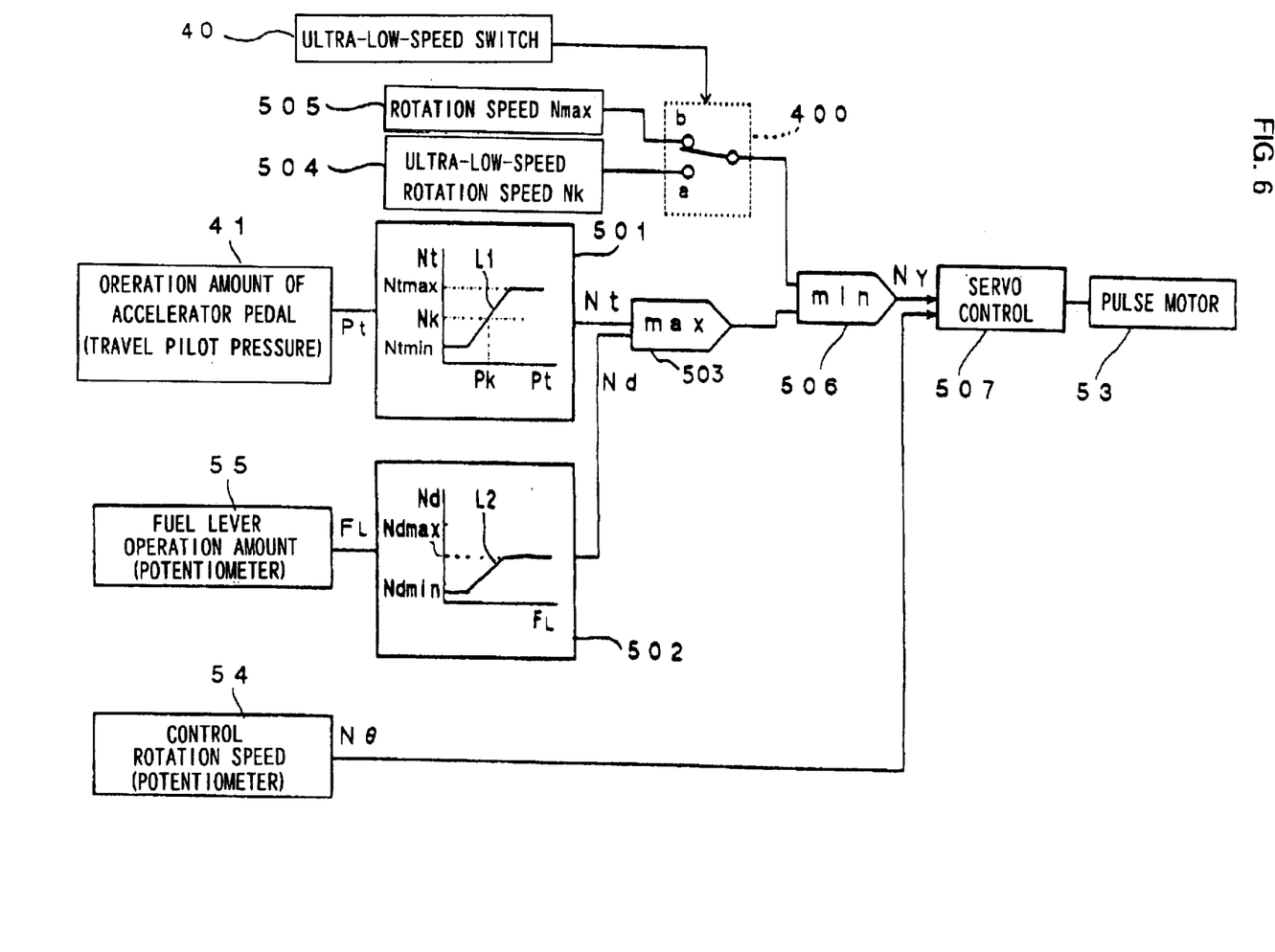
FIG. 6 is a drawing for describing detail of the control circuit shown in FIG. 5.

FIG. 6 is a conceptual drawing for describing details of the engine speed control in the controller 50. A function generator 501 outputs a travel target engine rotation speed Nt in proportion to amount of depression of the accelerator pedal 22. Specifically, the function generator 501 outputs the travel target rotation speed Nt determined according to a function (engine speed characteristic) L1 correlating a target rotation speed of the engine 2 with a pilot pressure Pt detected by the travel pilot pressure sensor 41. A function generator 502 outputs a target engine rotation speed Nd proportional to extent of operation of the fuel lever 55*a*. Specifically, the function generator 502 outputs a control lever target rotation speed Nd determined according to a function (engine speed characteristic) L2 correlating a target rotation speed of the engine 2 with a signal FL dependent on extent of operation of the fuel lever 55*a*.

These target rotation speeds Nt and Nd are determined between idle rotation speeds Ntmin, Ndmin and maximum rotation speeds Ntmax, Ndmax set in the engine speed characteristics L1 and L2. It is to be noted that the engine speed characteristic L1 increases a target engine rotation speed more rapidly than the engine speed characteristic L2, namely, it has a steeper gradient. The engine speed characteristics L1 and L2 are set so as to satisfy the relationships where the idle rotation speeds are Ntmin>Ndmin, and the maximum rotation speeds are Ntmax>Ndmax.

The target rotation speed Nt output from the function generator 501 and the target rotation speed Nd output from the function generator 502 are input to a maximum value selection circuit 503. The maximum value selection circuit 503 compares the target rotation speed Nt with the target rotation speed Nd. And, the maximum value selection circuit 503 selects one of the two target rotation speeds that is larger.

A ultra-low-speed rotation speed Nk, being a value that is lower than at least the maximum rotation speed Ntmax of engine speed characteristic L1, is set in a rotation speed setting unit 504. A rotation speed Nmax, being a value that is higher than at least the maximum rotation speed Ntmax of engine speed characteristic L1, is set in a rotation speed setting unit 505. It is to be noted that the ultra-low-speed rotation speed Nk is a value such that the vehicle travels at ultra-low-speed (for example, 2 km/h) when all of the conditions for ultra-low-speed travel described below are satisfied. The conditions for ultra-low-speed travel are:

(1) A pump displacement amount is at the minimum qpmin.
(2) The control valve 4B is at the neutral position.
(3) A motor displacement amount is at the maximum qmmax.
(4) The transmission 7 is set to the low speed range (gear ratio RL).

With respect to the engine speed characteristic L1, it becomes the ultra-low-speed rotation speed Nk at the pilot pressure Pk.

A switch 400 is switched by on/off operation of the ultra-low-speed switch 40. When the ultra-low-speed switch 40 is turned on, the switch 400 is switched to the a position, and the ultra-low-speed rotation speed Nk is input to a minimum value selection circuit 506. On the other hand, when the ultra-low-speed switch 40 is turned off, the switch 400 is switched to the b position to input the rotation speed Nmax. The minimum value selection circuit 506 compares the input values Nk or Nmax with the value Nt or Nd selected by the maximum value selection circuit 503, and selects the smallest value among them. The value output from the minimum value selection circuit 506 is input to a servo control section 507 as a target rotation speed Ny. The servo control section 507 compares the target rotation speed Ny with a control rotation speed Nθ corresponding to a displacement amount of the governor lever detected by the potentiometer 54. The servo control section 507 controls the pulse motor 53 according to the result of comparison of the target rotation speed Ny and the control rotation speed Nθ. In this manner, the rotation speed of the engine 2 is controlled.

Figure 7:
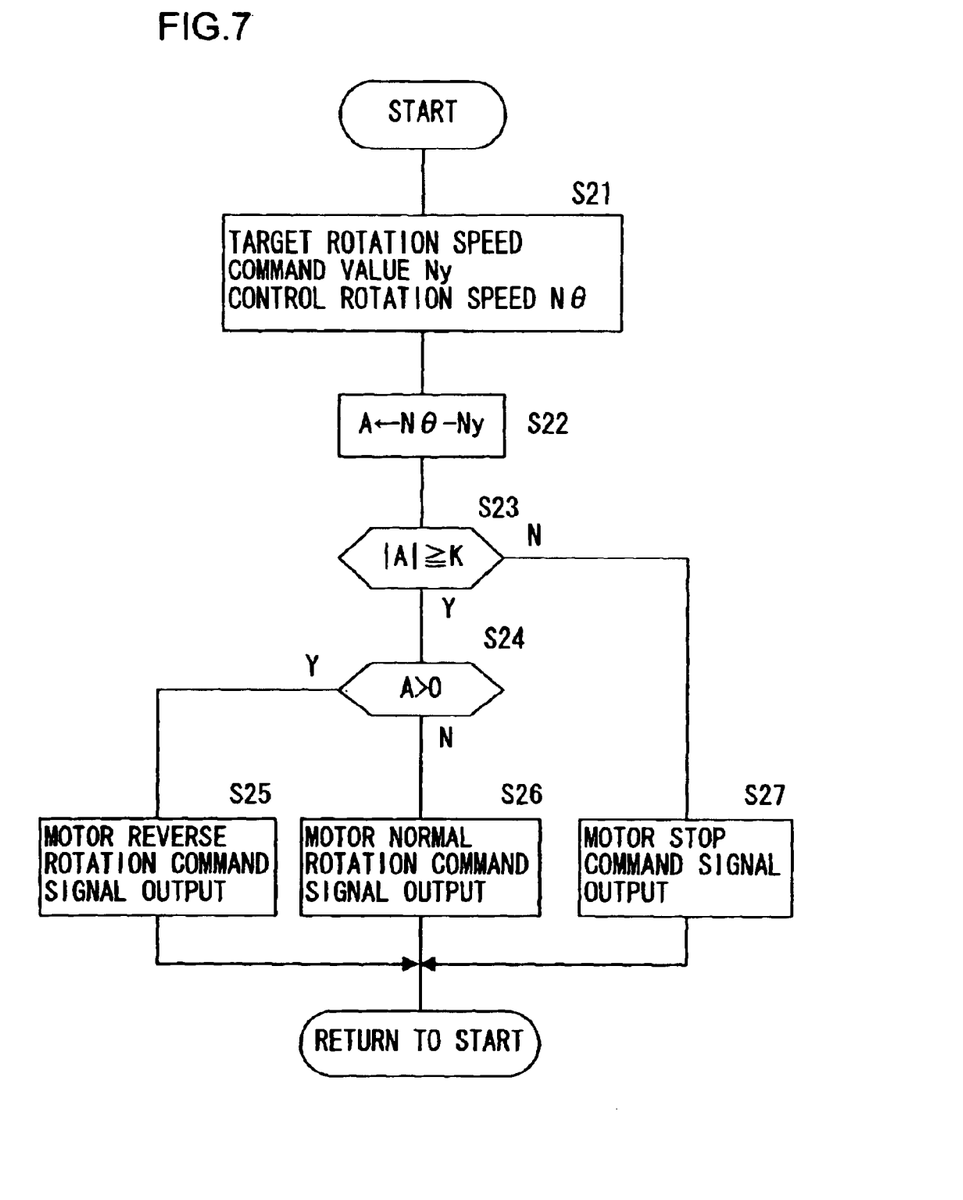
FIG. 7 is a flowchart showing a processing sequence of an engine speed control program.

FIG. 7 is a flowchart showing a processing sequence of a control program for the pulse motor 53 carried out in the servo control section 507. In accordance with the sequence shown in the flow chart of FIG. 7, the servo control section 507 controls the pulse motor 53 so that the target rotation speed Ny and control rotation speed Nθ correspond. Hereinafter, control of the pulse motor 53 will be described using the flowchart of FIG. 7.

In step S21, the target rotation speed command value Ny and the control rotation speed Nθ are respectively read in. In step S22, the target rotation speed command value Ny is subtracted from the control rotation speed Nθ (Nθ−Ny). The result of subtraction is then stored in a memory, not shown, as a rotation speed difference A. In step S23, it makes a decision as to whether or not $|A|\geq K$ using a predetermined reference rotational speed difference K. If an affirmative decision is made in step S23 that $|A|\geq K$, processing advances to step S24. In step S24, it makes a decision as to whether or not the rotation speed difference A>0.

If an affirmative decision is made in step S24 that A>0, it indicates that the control rotation speed Nθ is larger than the target rotation speed command value Ny. Processing then advances to step S25, where a signal instructing motor reversal is output to the pulse motor 53 in order to lower engine speed. In this manner the pulse motor 53 is reversed and engine speed is lowered.

On the other hand, if it is determined in step S24 that $A\leq 0$, it indicates that the control rotation speed Nθ is smaller than the target rotation speed command value Ny. In that case, processing advances to step S26 where a signal instructing normal motor rotation is output to the pulse motor 53 in order to increase the engine speed. In this manner, the pulse motor 53 is rotated normally to increase rotation speed of the engine 2.

If a negative decision is made in step S23, processing advances to step S27 where a motor stop signal is output to the pulse motor 53. In this manner, the rotation speed of the engine 2 is maintained at a substantially fixed value. Once steps S25 to S27 have been executed, processing returns to the start.

The structure of a speed control system for a wheeled hydraulic traveling vehicle of the present invention has been described above. Next, explanation will be given to how a wheeled hydraulic traveling vehicle mounted with the speed control system varies its speed.

(1) First Gear Travel (Ultra-low-speed Travel)

In order to perform first gear travel, the gear ratio of the transmission 7 is set to the largest gear ratio RL, and the ultra-low-speed switch 40 is turned on.

By turning the ultra-low-speed switch 40 on, electricity from a power source 42 acts on each solenoid of the solenoid switching valve 61 and the solenoid valves 62–64. Accordingly the solenoid switching valve 61 is switched to the O position. Also, the solenoid valves 62–64 are respectively switched from the a position to the b position. Pressure oil from the hydraulic source 30 acts on the maximum displacement restriction section 11b of the regulator 11A for the hydraulic pump 3A. A pump displacement amount qp is fixed to the minimum displacement amount qpmin. In addition, pressure oil from the hydraulic source 60 acts on the bottom chamber of the servo piston 15 and the motor displacement amount is fixed to the maximum displacement amount qmmax. Pipelines connecting the pilot ports P1 and P3 and the pilot ports P2 and P4 of the control valves 4A and 4B are respectively disconnected.

In this condition, the forward and reverse switching valve 25 is driven, for example, to the forward side (F position) by lever operation, and also the accelerator pedal 22 is pressed down. Pilot pressure is then supplied from the pilot pump 21 to the pilot port P1 of the control valve 4A, and the control valve 4A is switched to the position F. The pressure oil is supplied from the main pump 3A to the travel motor 1. At this time, if the accelerator pedal 22 is operated to its maximum extent, the ultra-low-speed rotation speed Nk is selected as the target rotation speed as a result of the processing in the controller 50 as shown in FIG. 6. The engine speed is controlled to the ultra-low-speed speed Nk with the processing shown in the flowchart of FIG. 7.

As a result, the vehicle travels at an ultra-low-speed suitable for carrying out operations such as a mowing etc. If the accelerator pedal 22 is released slightly to reduce the travel pilot pressure Pt to less than or equal to the specified value Pk, the target rotation speed Nt becomes lower than the ultra-low-speed rotation speed Nk and the vehicle travels at an even lower speed.

(2) Second Gear Travel

In the first gear state, if the gear ratio of the transmission 7 is set to RH (RH<RL) the second gear state is entered. At this time, the ultra-low-speed switch 40 remains on, however, it is possible for the vehicle to travel at higher speed as the gear ratio becomes smaller.

(3) Third Gear Travel

For third gear travel, the gear ratio of the transmission 7 is set to RL, and the ultra-low-speed switch 40 is turned off.

Since the ultra-low-speed switch 40 is turned off, the solenoid switching valve 61 is switched to the C position. Also, the solenoid valves 62–64 are respectively switched to position a. Accordingly, the pressure oil for acting on the maximum displacement restriction section 11$b$ of the pump regulator 11A is cut off. The pump displacement qp is controlled along the P-pq characteristic shown in FIG. 3 in response to the pump pressure P, and horsepower control is carried out. The pressure oil acting on the bottom chamber of the servo piston 15 is also cut off. The motor displacement qm is then controlled along the characteristic shown in FIG. 4 in response to the motor drive pressure Pm. The pilot ports P1 and P3, and the pilot ports P2 and P4, of the control valves 4A and 4B, are respectively connected.

In this condition, the forward and reverse switching valve 25 is driven to the forward side (F position), and also the accelerator pedal 22 is pressed down. The control valves 4A and 4B are switched in response to a travel pilot pressure Pt that is generated according to the force with which the pedal is pressed down. In this manner, the pressure oil from the hydraulic pumps 3A and 3B is supplied to the hydraulic motor 1. At this time, if the fuel lever 55$a$ is operated to its minimum extent, the rotation speed Nt corresponding to amount of depression of the accelerator pedal 22 is selected as the target rotation speed Ny, as a result of the processing in the controller 50 as shown in FIG. 6. Accordingly, the engine speed is varied according to amount of depression of the accelerator pedal 22, and the vehicle travels at a speed dependent on the pedal operation.

(4) Fourth Gear Travel

If the gear ratio of the transmission 7 is changed to RH in the third gear state, the fourth gear state is entered. In this way, it is possible to allow the vehicle to travel at maximum speed.

With this embodiment of the invention, by switching the ultra-low-speed switch 40 on, as well as by setting the gear ratio of the transmission 7 to its largest gear ratio RL, a wheeled hydraulic traveling vehicle becomes able to travel at an extreme-low-speed.

Supply of pilot pressure to the control valve 4B is cut off in response to the ultra-low-speed switch 40 turned on, and the hydraulic motor 1 is driven by the pressure oil only from the main pump 3A. The pump displacement amount qp is fixed to the minimum displacement amount qpmin, and the engine speed is restricted to the ultra-low-speed rotation speed Nk. Accordingly, the pressure oil supplied to the hydraulic motor 1 is significantly reduced. Also, since the motor displacement amount qm is fixed to the maximum displacement amount qmmax, an upper limit of the motor rotation speed is set to a much lower value. As a result, while depressing the accelerator pedal 22 to its maximum extent it is possible to realize the ultra-low-speed travel. Since it is not necessary for an operator to carefully adjust the extent to which the accelerator pedal 22 is pressed down, it is easy for him or her to operate.

With the above described embodiment, the control valve 4B is switched to the neutral position, the hydraulic pump 3A is fixed to the minimum displacement amount qpmin and the hydraulic motor 1 is fixed to the maximum displacement amount qmmax. In addition, the engine speed is controlled to the ultra-low-speed rotation speed Nk so as to realize the ultra-low-speed travel. It is to be noted that pump delivery oil is significantly reduced compared to the related art, simply by switching the control valve 4B to the neutral position. This means that if the control valve 4B is switched to the neutral position and the hydraulic motor 1 is fixed to the maximum displacement qmmax, it is not always necessary to fix the hydraulic pump 3A to the minimum displacement amount qpmin or to control the engine speed to the ultra-low-speed rotation speed Nk. The capacity of the pump itself is not lowered even if switching the control valve 4B to the neutral position, which means that there is no effect on drive on other actuators such as hydraulic cylinders for driving a boom, arm and bucket, etc.

Instead of using a plurality of hydraulic pumps, it is also possible to apply the present invention to a speed control system for a wheeled hydraulic traveling vehicle that drives a hydraulic motor with a single pump. In this case, it is not necessary to install the control valve 4B because there is only one hydraulic pump. By fixing a motor displacement to the maximum displacement as described above, the ultra-low-speed travel is realized. It is possible to realize the ultra-low-speed travel easily by additionally regulating a pump displacement or a rotation speed of a prime mover.

With the above described embodiment, the transmission 7 is switched by manual operation. However, it is possible to automatically switch the transmission 7 to a low speed range in response to the ultra-low-speed switch 40 turned on and not to perform second gear travel described above. Also as described above, an example has been shown where the engine target rotation speed is set according to operation amount of the accelerator pedal 22 or the fuel lever 55$a$, but it is also possible to apply the present invention to systems setting the target rotation speed using an up/down switch.

With the above described embodiment, a pair of hydraulic pumps 3A and 3B and a pair of control valves 4A and 4B are provided in the traveling hydraulic circuit, but it is also possible to provide three or more hydraulic pumps and control valves. The present invention can be also applied to a wheeled hydraulic vehicle other than a wheeled hydraulic excavator.

As has been described above, a displacement amount of the hydraulic motor 1 is set to the maximum in response to an ultra-low-speed signal, and one control valve 4A is switched in response to a travel control signal while the other control valve 4B is maintained at a neutral position. As a result, an upper limit for rotation speed of the hydraulic motor 1 is lowered significantly, and traveling at extremely low speed can be realized easily. In the following, advantages of the speed control system for a wheeled hydraulic traveling vehicle of the present invention will be described.

If the ultra-low-speed travel command device 40 issues a signal of ultra-low-speed travel, a displacement amount of the hydraulic motor 1 is set to the maximum, and the pressure oil is permitted to flow from at least one hydraulic pump 3A to the hydraulic motor 1 while preventing pressure oil from the remaining hydraulic pump 3B flowing to the hydraulic motor 1. In this manner, the upper limit for the rotation speed of the hydraulic motor 1 is lowered significantly. As a result, with the accelerator pedal 22 depressed to the full extent, it is possible to easily realize the ultra-low-speed travel without operating the accelerator pedal 22 carefully.

When the ultra low speed travel signal is not issued, a displacement amount of the motor is controlled in response to pressure supplied to the hydraulic motor 1, and the pressure oil is permitted to flow from all of the hydraulic pumps to the hydraulic motor. In this manner, it is possible for the vehicle to travel at a wide range of speeds corresponding to the amount of depression of the accelerator pedal 22.

A rotation speed of the prime mover 2 and a displacement of the hydraulic pump 3A are controlled in response to an ultra low speed travel signal. In this manner, the ultra-lowspeed travel is more easily achieved. Also, if the largest gear ratio is set by the gear ratio changing device 7 and the ultra low speed travel signal is issued, the ultra-low-speed travel can be reliably realized.

What is claimed is:

1. A speed control system for a wheeled hydraulic traveling vehicle, comprising:
    a plurality of variable displacement hydraulic pumps respectively driven by a prime mover;
    a pump displacement regulation device that respectively regulates displacement amount of the hydraulic pumps;
    a variable displacement hydraulic motor for traveling driven by pressure oil discharged from the plurality of hydraulic pumps;
    a motor displacement regulation device that regulates a displacement amount of the hydraulic motor;
    a plurality of control valves, respectively provided in correspondence with the hydraulic pumps, that controls flow of the pressure oil supplied to the hydraulic motor from the hydraulic pumps in response to a travel control command;
    an ultra low speed command device that issues an ultra low speed travel signal for the wheeled hydraulic traveling vehicle to use an ultra low speed set as an upper limit; and
    a first ultra low speed control device that controls the motor displacement regulation device to set the displacement amount of the hydraulic motor to maximum, and also controls drive of the control valves to allow the pressure oil to flow from at least one of the plurality of hydraulic pumps to the hydraulic motor while preventing the pressure oil flowing from the remaining hydraulic pumps to the hydraulic motor, if the ultra low speed travel command is issued by the ultra low speed command device, wherein:
    when the ultra low speed travel signal is issued by the ultra low speed command device, the wheeled hydraulic traveling vehicle travels at a speed in accordance with an amount of depression of an accelerator pedal, with the upper limit of the speed being the ultra low speed.

2. A speed control system for a wheeled hydraulic traveling vehicle according to claim 1, wherein:
    when the ultra low speed travel signal is not issued by the ultra low speed command device, the first ultra low speed control device controls the motor displacement regulation device to vary the displacement amount of the motor in response to pressure supplied to the hydraulic motor, and controls drive of the control valves to allow the pressure oil to flow from the plurality of hydraulic pumps to the hydraulic motor.

3. A speed control system for a wheeled hydraulic traveling vehicle according to claim 1, further comprising: a gear ratio change device that changes a gear ratio between an output shaft of the hydraulic motor and vehicle wheels with at least two levels.

4. A speed control system for a wheeled hydraulic traveling vehicle according to claim 3, wherein:
    the gear ratio change device sets a largest gear ratio in response to the ultra low speed travel signal from the ultra low speed command device.

5. A speed control system for a wheeled hydraulic traveling vehicle according to claim 1, wherein:
    the wheeled hydraulic traveling vehicle travels at a speed from a low-speed range to a high-speed range; and
    the ultra low speed falls within a lowermost range of the low speed range.

6. A speed control system for a wheeled hydraulic traveling vehicle, comprising:
    a plurality of variable displacement hydraulic pumps respectively driven by a prime mover;
    a pump displacement regulation device that respectively regulates displacement amount of the hydraulic pumps;
    a variable displacement hydraulic motor for traveling driven by pressure oil discharged from the plurality of hydraulic pumps;
    a motor displacement regulation device that regulates a displacement amount of the hydraulic motor;
    a plurality of control valves, respectively provided in correspondence with the hydraulic pumps, that controls flow of the pressure oil supplied to the hydraulic motor from the hydraulic pumps in response to a travel control command;
    an ultra low speed command device that issues an ultra low speed travel signal;
    a first ultra low speed control device that controls the motor displacement regulation device to set the displacement amount of the hydraulic motor to maximum, and also controls drive of the control valves to allow the pressure oil to flow from at least one of the plurality of hydraulic pumps to the hydraulic motor while preventing the pressure oil flowing from the remaining hydraulic pumps to the hydraulic motor, if the ultra low speed travel command is issued by the ultra low speed command device;
    a rotation speed adjustment device that adjusts a rotation speed of the prime mover; and
    a second ultra low speed control device that controls the rotation speed adjustment device, when the ultra low speed travel signal is issued by the low speed command device, to set an upper limit of the rotation speed of the prime mover lower than an upper limit set when the ultra low speed travel signal is not issued.

7. A speed control system for a wheeled hydraulic traveling vehicle according to claim 6, further comprising:
    a third ultra low speed control device that controls the pump displacement regulation device to reduce the displacement amount of the at least one of the plurality of hydraulic pumps permitted to flow the pressure oil to the hydraulic motor by a specified amount when the ultra low speed travel signal is issued by the ultra low speed command device.

8. A speed control system for a wheeled hydraulic traveling vehicle according to claim 6, further comprising:
    a gear ratio change device that changes a gear ratio between an output shaft of the hydraulic motor and vehicle wheels with at least two levels.

9. A speed control system for a wheeled hydraulic traveling vehicle, comprising:
    a plurality of variable displacement hydraulic pumps respectively driven by a prime mover;
    a pump displacement regulation device that respectively regulates displacement amount of the hydraulic pumps;
    a variable displacement hydraulic motor for traveling driven by pressure oil discharged from the plurality of hydraulic pumps;
    a motor displacement regulation device that regulates a displacement amount of the hydraulic motor;
    a plurality of control valves, respectively provided in correspondence with the hydraulic pumps, that controls flow of the pressure oil supplied to the hydraulic motor from the hydraulic pumps in response to a travel control command;

an ultra low speed command device that issues an ultra low speed travel signal;

a first ultra low speed control device that controls the motor displacement regulation device to set the displacement amount of the hydraulic motor to maximum, and also controls drive of the control valves to allow the pressure oil to flow from at least one of the plurality of hydraulic pumps to the hydraulic motor while preventing the pressure oil flowing from the remaining hydraulic pumps to the hydraulic motor, if the ultra low speed travel command is issued by the ultra low speed command device; and a third ultra low speed control device that controls the pump displacement regulation device to reduce the displacement amount of the at least one of the plurality of hydraulic pumps permitted to flow the pressure oil to the hydraulic motor, by a specified amount when the ultra low speed travel signal is issued by the ultra low speed command device.

10. A speed control system for a wheeled hydraulic traveling vehicle according to claim 9, wherein:

when the ultra low speed travel signal is not issued by the ultra low speed command device, the third ultra low speed control device controls the pump displacement regulation device to adjust the displacement amount of the plurality of hydraulic pumps according to discharge pressure of the hydraulic pumps.

11. A speed control system for a wheeled hydraulic traveling vehicle according to claim 9, further comprising:

a gear ratio change device that changes a gear ratio between an output shaft of the hydraulic motor and vehicle wheels with at least two levels.

12. A speed control system for a wheeled hydraulic traveling vehicle comprising:

a plurality of variable displacement hydraulic pumps respectively driven by a prime mover;

a pump displacement regulation device that respectively regulates a displacement amount of the plurality of hydraulic pumps;

a variable displacement hydraulic motor for traveling driven by pressure oil discharged from the hydraulic pumps;

a motor displacement regulation device that regulates a displacement amount of the hydraulic motor;

a plurality of control valves, respectively provided in correspondence with the hydraulic pumps, that controls flow of the pressure oil supplied to the hydraulic motor from the hydraulic pumps in response to a travel control signal;

a rotation speed adjustment device that adjusts a rotation speed of the prime mover;

a gear ratio change device that changes a gear ratio between an output shaft of the hydraulic motor and vehicle wheels with at least two levels;

an ultra low speed command device that issues an ultra low speed travel signal;

a first ultra low speed control device that controls drive of the control valves;

a second ultra low speed control device that controls the rotation speed adjustment device; and a third ultra low speed control device that controls the pump displacement regulation device, wherein:

if the ultra low speed travel signal is issued by the ultra low speed command device, the first ultra low speed control device controls the motor displacement regulation device to set the displacement amount of the hydraulic motor to maximum, and also controls the drive of the control valves to allow the pressure oil to flow from at least one of the plurality of hydraulic pumps to the hydraulic motor, while preventing the pressure oil flowing from the remaining hydraulic pumps to the hydraulic motor, the second ultra low speed control device controls the rotation speed adjustment device to set an upper limit of the rotation speed of the prime mover lower than an upper limit set when the ultra low speed travel signal is not issued, and the third low speed control device controls the pump displacement regulation device to reduce the displacement amount of the hydraulic pump by a specified amount.

13. A speed control system for a wheeled hydraulic traveling vehicle, comprising:

a variable displacement hydraulic pump driven by a prime mover;

a pump displacement regulation device that regulates a displacement amount of the hydraulic pump;

a variable displacement hydraulic motor for traveling driven by pressure oil discharged from the hydraulic pump;

a motor displacement regulation device that regulates a displacement amount of the hydraulic motor;

a control valve that controls flow of the pressure oil supplied to the hydraulic motor from the hydraulic pump in response to a travel control command;

an ultra low speed command device that issues an ultra low speed travel signal for the wheeled hydraulic traveling vehicle to use an ultra low speed set as an upper limit; and an ultra low speed control device that controls the motor displacement regulation device to set the displacement amount of the hydraulic motor to maximum if the ultra low speed travel signal is issued by the low speed command device, wherein:

when the ultra low speed travel signal is issued by the ultra low speed command device, the wheeled hydraulic traveling vehicle travels at a speed in accordance with an amount of depression of an accelerator pedal, with the upper limit of the speed being the ultra low speed.

14. A speed control system for a wheeled hydraulic traveling vehicle according to claim 13, wherein:

if the ultra low speed travel signal is issued by the ultra low speed command device, the ultra low speed control device also controls the pump displacement regulation device to set the displacement amount of the hydraulic pump to a specified displacement amount.

15. A speed control system for a wheeled hydraulic traveling vehicle according to claim 13, wherein:

the wheeled hydraulic traveling vehicle travels at a speed from a low-speed range to a high-speed range; and the ultra low speed falls within a lowermost range of the low speed range.

16. A speed control system for a wheeled hydraulic traveling vehicle, comprising:

a variable displacement hydraulic pump driven by a prime mover;

a pump displacement regulation device that regulates a displacement amount of the hydraulic pump;

a variable displacement hydraulic motor for traveling driven by pressure oil discharged from the hydraulic pump;

a motor displacement regulation device that regulates a displacement amount of the hydraulic motor;

a control valve that controls flow of the pressure oil supplied to the hydraulic motor from the hydraulic pump in response to a travel control command;

an ultra low speed command device that issues an ultra low speed travel signal;

an ultra low speed control device that controls the motor displacement regulation device to set the displacement amount of the hydraulic motor to maximum if the ultra low speed travel signal is issued by the low speed command device; and a rotation speed adjustment device that adjust a rotation speed of the prime mover, wherein:

if the ultra low speed travel signal is issued by the ultra low speed command device, the ultra low speed control device also controls the rotation speed adjustment device to regulate the rotation speed of the prime mover to a specified rotation speed.

* * * * *